United States Patent
Tervo

(10) Patent No.: US 10,175,423 B2
(45) Date of Patent: Jan. 8, 2019

(54) OPTICAL WAVEGUIDE USING OVERLAPPING OPTICAL ELEMENTS

(71) Applicant: Microsoft Technology Licensing, LLC, Redmond, WA (US)

(72) Inventor: Jani Kari Tapio Tervo, Espoo (FI)

(73) Assignee: Microsoft Technology Licensing, LLC, Redmond, WA (US)

(*) Notice: Subject to any disclaimer, the term of this patent is extended or adjusted under 35 U.S.C. 154(b) by 43 days.

(21) Appl. No.: 15/609,882

(22) Filed: May 31, 2017

(65) Prior Publication Data

US 2018/0348427 A1 Dec. 6, 2018

(51) Int. Cl.
| G02B 6/43 | (2006.01) |
| G02B 6/124 | (2006.01) |
| G02F 1/295 | (2006.01) |
| F21V 8/00 | (2006.01) |
| G02B 6/293 | (2006.01) |

(52) U.S. Cl.
CPC .......... *G02B 6/124* (2013.01); *G02B 6/0026* (2013.01); *G02B 6/43* (2013.01); *G02B 6/29323* (2013.01); *G02B 6/29334* (2013.01)

(58) Field of Classification Search
CPC ........ G02B 6/43; G02B 6/124; G02B 6/4261; G02B 6/105; G02B 6/0026; G02B 6/29323; G02B 6/29334; G02B 6/10; G02B 6/26; G02B 5/1833; H04N 5/74; G02F 1/295

See application file for complete search history.

(56) References Cited

U.S. PATENT DOCUMENTS

| 4,946,245 | A | * | 8/1990 | Chamberlin | G02B 6/02085 385/37 |
| 5,081,615 | A | * | 1/1992 | Sunagawa | G02B 6/34 369/112.27 |
| 6,790,697 | B2 | * | 9/2004 | Kobayashi | G02B 6/125 257/E27.12 |
| 8,160,411 | B2 | | 4/2012 | Levola et al. | |
| 8,320,032 | B2 | * | 11/2012 | Levola | G02B 5/1814 359/13 |
| 8,508,848 | B2 | | 8/2013 | Saarikko | |

(Continued)

FOREIGN PATENT DOCUMENTS

| WO | 2006064334 A1 | 6/2006 |
| WO | 2016020643 A1 | 2/2016 |

OTHER PUBLICATIONS

U.S. Appl. No. 15/097,661, Vallius, et al., "TNT Butterfly Architecture to Extend the Field-of-View", filed Apr. 13, 2016.
U.S. Appl. No. 15/142,348, Tervo, et al., "TNT Robust Architecture for Large Field of View Components ", filed Apr. 29, 2016.

(Continued)

*Primary Examiner* — Akm Enayet Ullah
(74) *Attorney, Agent, or Firm* — Holzer Patel Drennan

(57) ABSTRACT

An optical waveguide that performs both in-coupling and out-coupling using two diffractive optical elements is provided. Each optical element is a diffraction grating and can be applied to the same or different surface of the optical waveguide. The diffraction gratings overlap to form two overlapping regions. The first overlapping region in-couples light into the waveguide and the second overlapping region out-couples light from the optical waveguide. Because the optical waveguide only uses two gratings, and therefore only has two grating vectors, the optical waveguide is easier to manufacture than optical waveguides with a greater number of grating vectors.

20 Claims, 8 Drawing Sheets

(56) References Cited

U.S. PATENT DOCUMENTS

| | | | |
|---|---|---|---|
| 8,546,899 B2* | 10/2013 | Takabayashi | G02B 6/12002 |
| | | | 257/141 |
| 8,654,420 B2 | 2/2014 | Simmonds | |
| 9,654,420 B2* | 5/2017 | Kariya | H04L 43/0811 |
| 2003/0123827 A1* | 7/2003 | Salerno | B82Y 20/00 |
| | | | 385/129 |
| 2009/0303599 A1 | 12/2009 | Levola | |
| 2012/0014837 A1* | 1/2012 | Fehr | B01L 3/502707 |
| | | | 422/82.11 |
| 2013/0170784 A1* | 7/2013 | Kim | G02B 6/122 |
| | | | 385/3 |
| 2014/0112613 A1 | 4/2014 | Hsieh et al. | |
| 2014/0300966 A1 | 10/2014 | Travers et al. | |
| 2016/0266331 A1* | 9/2016 | Hutchison | G02B 6/12016 |
| 2016/0327705 A1 | 11/2016 | Simmonds et al. | |
| 2017/0299865 A1* | 10/2017 | Vallius | G02B 6/0016 |
| 2017/0307886 A1* | 10/2017 | Stenberg | G02B 5/1814 |
| 2017/0357841 A1* | 12/2017 | Popovich | G02B 26/0808 |

OTHER PUBLICATIONS

U.S. Appl. No. 15/407,957, Vallius, et al., "TNT Optical Device to Produce Uniform Images ", filed Jan. 17, 2017.

US. Application No. 359365.01, Tervo, Jani, "TNT Two-dimensional expander—Additional degrees of freedom for periods in even order expansion", Filed Date: May 7, 2016.

Han, et al., "Portable Waveguide Display System with a Large Field of view by Integrating Freeform Elements and Volume Holograms", In Journal of Optics Express, vol. 23, Issue 3, Feb. 4, 2015, pp. 3534-3549.

* cited by examiner

305

310

OPTICAL WAVEGUIDE USING OVERLAPPING OPTICAL ELEMENTS

BACKGROUND

Optical waveguides can be used to expand or replicate the exit pupil of an imaging system in one or two dimensions. Typically, light from the exit pupil of the imaging system is received in the waveguide through an in-coupling, and travels through the waveguide in a direction. The light then exits the waveguide through an out-coupling that is larger than the in-coupling, creating an expanded pupil.

Current waveguides typically use optical elements such as crossed gratings and double-sided gratings to in-couple and out-couple light. Crossed gratings are gratings that are periodic in two dimensions, while double-sided gratings are gratings that are located on both surfaces of the optical waveguide.

However, there are drawbacks associated with both cross and double-sided gratings. Crossed gratings are difficult to manufacture and typically do not have as many degrees of freedom (e.g., depth, slant, duty cycle, and fill factor) as double-sided gratings. Double-sided gratings have tight rotation tolerances and are therefore also difficult to manufacture.

SUMMARY

An optical waveguide that performs both in-coupling and out-coupling using two diffractive optical elements is provided. Each optical element is a diffraction grating and can be applied to the same or different surface of the optical waveguide. The diffraction gratings overlap to form two overlapping regions. The first overlapping region in-couples light into the waveguide and the second overlapping region out-couples light from the optical waveguide. Because the optical waveguide only uses two gratings, and therefore only has two grating vectors, the optical waveguide is easier to manufacture than optical waveguides with a greater number of grating vectors.

In an implementation, an optical waveguide is provided. The optical waveguide includes a front surface and a rear surface. The optical waveguide further includes a first optical element and a second optical element. The first optical element is disposed on the first surface or the second surface and defines a first region. The second optical element is disposed on the first surface or the second surface and defines a second region. The first optical element overlaps the second optical element to define a third region and a fourth region. The third region is configured to receive a beam of light, and in-couple the received beam of light into the optical waveguide. The first and second regions are configured to cause the received beam of light to traverse within the optical waveguide in a first direction. The fourth region is configured to out-couple the received beam of light from the optical waveguide in a second direction.

In an implementation, a head mounted display device is provided. The head mounted display device includes a projector; a controller coupled to the projector and configured to cause the projector to project a beam of light; and a plurality of optical waveguides. Each optical waveguide may include: a first surface; a second surface; a first optical element disposed on the first surface of the second surface and defining a first region; and a second optical element disposed on the first surface or the second surface and defining a second region. The first optical element overlaps the second optical element to define a third region and a fourth region. The third region is configured to: receive a beam of light; and in-couple the received beam of light into the optical waveguide. The first and second regions are configured to cause the received beam of light to traverse within the optical waveguide in a first direction. The fourth region is configured to out-couple the received beam of light from the optical waveguide in a second direction.

In an implementation, a method for operating an optical waveguide is provided. The method includes: providing a first optical element on a first surface of the optical waveguide, wherein the first optical element defines a first region; providing a second optical element on a second surface of the optical waveguide, wherein the second optical element defines a second region, and wherein the first optical element overlaps the second optical element to define a third region and a fourth region; receiving a beam of light by the third region; in-coupling the received beam of light into the optical waveguide by the third region; causing the received beam of light to traverse within the optical waveguide in a first direction by one or both of the first region and the second region; and out-coupling the received beam of light from the optical waveguide in a second direction by the fourth region.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
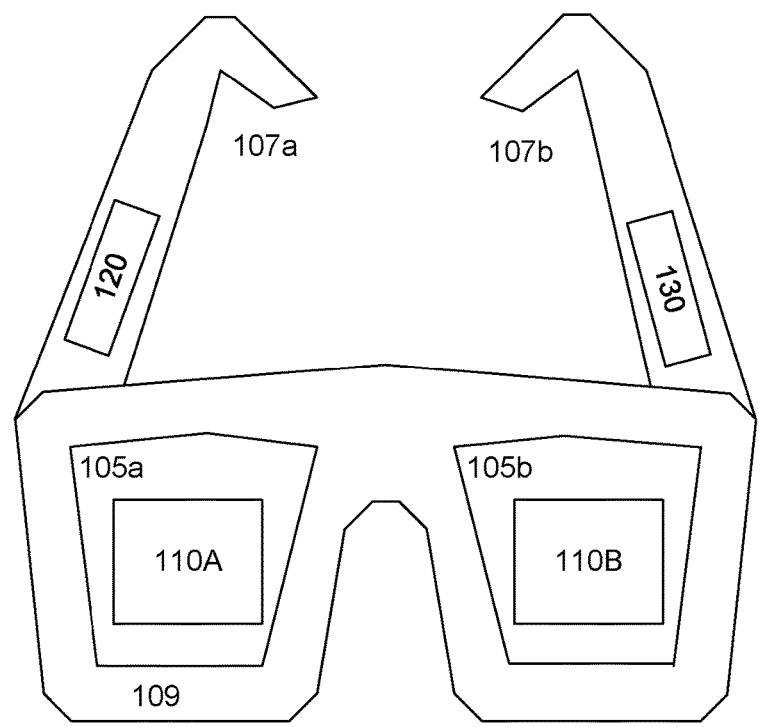
FIG. 1 is an illustration of an exemplary head mounted display device.

FIG. 1 is an illustration of an example head mounted display ("HMD") device 100. In an implementation, the HMD device 100 is a pair of glasses. The HMD device 100 includes lenses 105a and 105b arranged within a frame 109. The frame 109 is connected to a pair of temples 107a and 107b. Arranged between each of the lenses 105 and a wearer's eyes is a near-eye display system 110. The system 110A is arranged in front of a right eye and behind the lens 105A. The system 110B is arranged in front of a left eye and behind the lens 105B. The HMD device 110 also includes a controller 120 and one or more sensors 130. The controller 120 may be a microcomputer operatively coupled to both near-eye display systems 110 and to the sensors 130. Other types of controllers 120 may be used.

Sensors 130 may be arranged in any suitable location on the HMD device 100. They may include a gyroscope or other inertial sensors, a global-positioning system (GPS) receiver, and/or a barometric pressure sensor configured for altimetry. These sensors 130 may provide data on the wearer's location or orientation. From the integrated responses of the sensors 130, the controller 120 may track the movement of the HMD device 100 within the wearer's environment.

In some implementations, sensors 130 may include an eye tracker that is configured to detect an ocular state of the wearer of the HMD device 100. The eye tracker may locate a line of sight of the wearer, measure an extent of iris closure, etc. If two eye trackers are included, one for each eye, then the two may be used together to determine the wearer's focal plane based on the point of convergence of the lines of sight of the wearer's left and right eyes. This information may be used by controller 120 for placement of a computer-generated display image, for example.

In some implementations, each near-eye display system 110 may be at least partly transparent, to provide a substantially unobstructed field of view in which the wearer can directly observe their physical surroundings. Each near-eye display system 110 may be configured to present, in the same field of view, a computer-generated display image.

The controller 120 may control the internal componentry of near-eye display systems 110A and 110B to form the desired display images. In an implementation, the controller 120 may cause near-eye display systems 110A and 110B to display approximately the same image concurrently, so that the wearer's right and left eyes receive the same image at approximately the same time. In other implementations, the near-eye display systems 110A and 110B may project somewhat different images concurrently, so that the wearer perceives a stereoscopic, i.e., three-dimensional, image.

In some implementations, the computer-generated display image and various real images of objects sighted through the near-eye display systems 110 may occupy different focal planes. Accordingly, the wearer observing a real-world object may shift their corneal focus to resolve the display image. In other implementations, the display image and at least one real image may share a common focal plane.

In the HMD device 100, each of the near-eye display systems 110A and 110B may also be configured to acquire video of the surroundings sighted by the wearer. The video may include depth video and may be used to establish the wearer's location, what the wearer sees, etc. The video acquired by each near-eye display system 110 may be received by the controller 120, and the controller 120 may be configured to process the video received. To this end, the HMD device 100 may include a camera. The optical axis of the camera may be aligned parallel to a line of sight of the wearer of the HMD device 100, such that the camera acquires video of the external imagery sighted by the wearer. As the HMD device 100 may include two near-eye display systems—one for each eye—it may also include two cameras. More generally, the nature and number of the cameras may differ in the various embodiments of this disclosure. One or more cameras may be configured to provide video from which a time-resolved sequence of three-dimensional depth maps is obtained via downstream processing.

No aspect of FIG. 1 is intended to be limiting in any sense, for numerous variants are contemplated as well. In some embodiments, for example, a vision system separate from the HMD device 100 may be used to acquire video of what the wearer sees. In some embodiments, a single near-eye display system 110 extending over both eyes may be used instead of the dual monocular near-eye display systems 110A and 110B shown in FIG. 1.

The HMD device 100 may be used to support a virtual-reality ("VR") or augmented-reality ("AR") environment for one or more participants. A realistic AR experience may be achieved with each AR participant viewing their environment naturally, through passive optics of the HMD device 100. Computer-generated imagery may be projected into the same field of view in which the real-world imagery is received. Imagery from both sources may appear to share the same physical space.

The controller 120 in the HMD device 100 may be configured to run one or more computer programs that support the VR or AR environment. In some implementations, one or more computer programs may run on the controller 120 of the HMD device 100, and others may run on an external computer accessible to the HMD device 100 via one or more wired or wireless communication links. Accordingly, the HMD device 100 may include suitable wireless componentry, such as Wi-Fi.

Figure 2:
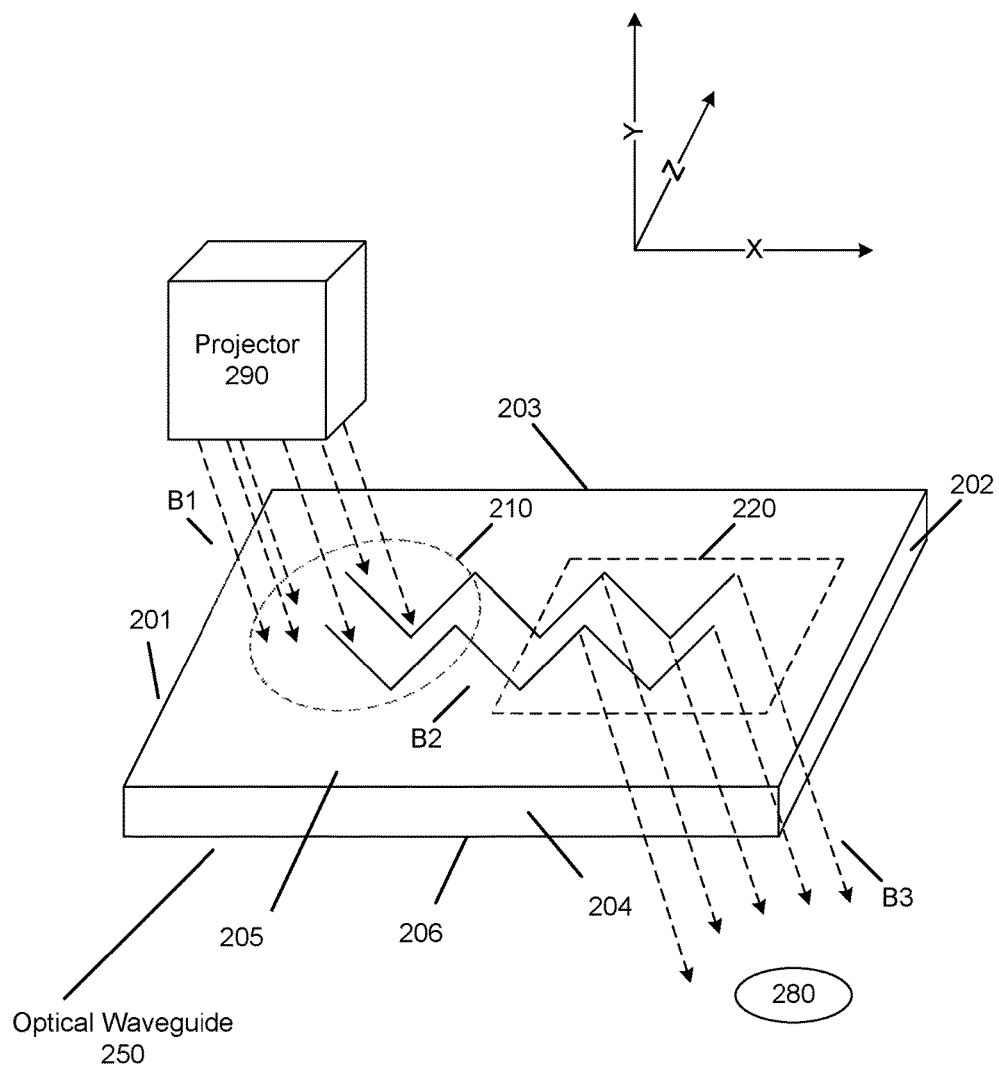
FIG. 2 is an illustration of a perspective view of an exemplary near-eye display system.

FIG. 2 is an illustration of a perspective view of an exemplary near-eye display system 200. The near-eye display system 200 may be an implementation of one or both of the near-eye display systems 110 shown in FIG. 1. In the example shown, the system 200 includes a projector 290 and an optical waveguide 250.

The projector 290 may be adapted to form a display image, and to project the display image through an exit pupil of the projector 290. Light corresponding to the display image is shown in the environment 200 as the beams B1. The projector 290 may be operatively coupled to the controller 120 (not pictured). The controller 120 may provide suitable control signals that, when received by the projector 290, cause the desired display image to be formed by the beams B1.

The optical waveguide 250 may include a plurality of surfaces including a front surface 205, a rear surface 206, a top surface 203, a bottom surface 204, a left-side surface 201, and a right-side surface 202. The optical waveguide 250 may be substantially transparent to light received normal to the front surface 205 in the z direction. Light received normal to the front surface 205 may pass through the front surface 205 and the rear surface 206 to an eye 280 of a wearer of the HMD device 100 that includes the optical waveguide 250. Thus, when the optical waveguide 250 is positioned in front of the eye 280 of the wearer of the HMD device 100, the optical waveguide 250 does not obstruct the ability of the wearer to view external imagery.

The optical waveguide 250 further includes an in-coupling region 210. The in-coupling region 210 may receive one or more of the beams B1 from an exit pupil of the projector 290, and may cause a portion of the beams B1 to enter the optical waveguide 250 (i.e., in-couple). The portion of the beams B1 that in-couples the optical waveguide 250 is illustrated in the optical waveguide 250 as the beams B2. As will be described further below, the in-coupling region 210 may comprise one or more overlapping optical elements ("OEs").

The in-coupled light B2 may propagate within the optical waveguide 250 in the x direction. The light B2 may reflect of the internal surfaces of the optical waveguide 250 until it reaches an out-coupling region 220 of the optical waveguide 250. The out-coupling region 220 may be on the rear surface 206 of the optical waveguide 250. At the out-coupling region 220, a portion of the light B2 may exit (i.e., out-couple) the optical waveguide 250 as the beams B3. The beams B3 may out-couple through the out-coupling region 220 in the y direction. Similar to the in-coupling region 210, the out-coupling region 220 may comprise one or more overlapping OEs. The overlapping OEs that form the out-coupling region 220 may be the same OEs that form the in-coupling region 210.

Each beam B3 may leave the out-coupling region 220 of the rear surface 206 through an exit pupil. The beams B3 may form the eye box, and may be received by the eye 280 of a wearer of the HMD device 100. The beams B3 may be a pupil expansion of the beams B1 output by the projector 290 and received by the in-coupling region 210.

Figure 3:
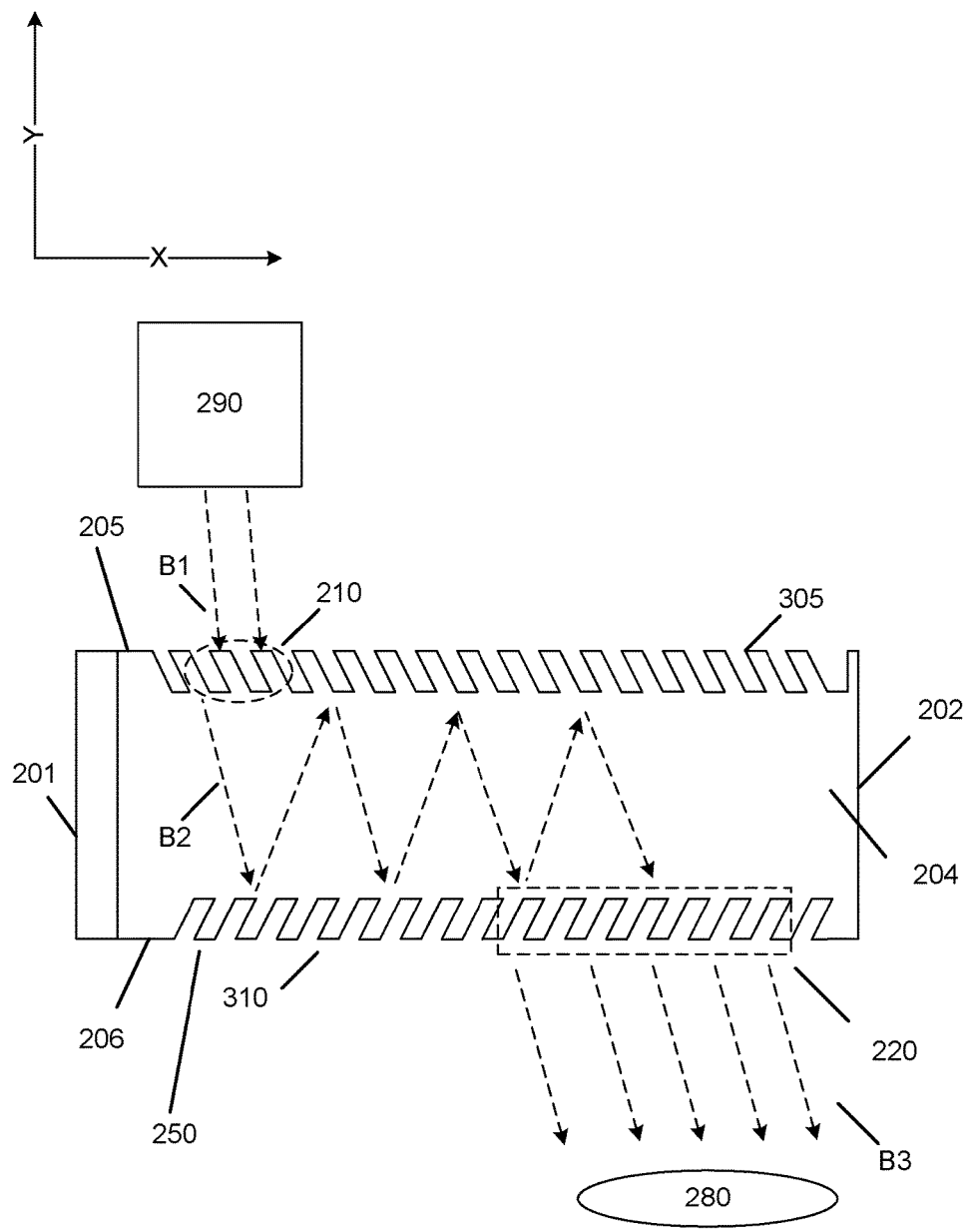
FIG. 3 is an illustration of a side view of an exemplary near-eye display system.

FIG. 3 is an illustration of a side view of the exemplary near-eye display system 200. In the example shown, the optical waveguide 250 further includes an OE 305 and an OE 310. The OEs 305 and 310 may be diffractive OEs such as surface-relief diffraction gratings ("SRGs"). However, other types of diffractive OEs may be used such as index-modulated gratings and volume gratings, for example. Moreover, the OEs 305 and 310 may include other types of OEs such as mirrors and prisms, for example.

The OE 305 and the OE 310 may be coatings, engravings, or etchings on the front surface 205 and/or rear surface 206 of the optical waveguide 250. In some implementations, the OE 305 may be applied to the front surface 205 and the OE 310 may be applied to the rear surface 206. Alternatively, both the OE 305 and the OE 310 may be applied to the front surface 205 or the rear surface 206.

The OE 305 may have a first grating period and a first grating direction. The OE 310 may have a second grating period and a second grating direction. The first and second grating directions may be opposite, or near opposite, grating directions. The first and second grating periods may be the same, or substantially the same, grating period.

In some implementations, the OEs 305 and 310 may be diffractive gratings. Example diffractive gratings may be surface relief gratings implemented by molding or embossing or index-modulated gratings.

In other implementations, the OE 305 and the OE 310 may be polarization gratings made of birefringent material. The profile of the OE 305 and the OE 310 may be sinusoidal, binary rectangular, or blazed, for example. Alternatively, the profile of the OE 305 and the OE 310 may be binary slanted or sinusoidal slanted. The OE 305 and the OE 310 may be embedded in the optical waveguide 250.

The specific grating directions and grating periods for the OEs 305 and 310 may be determined based on the size and shape of the various components making up the optical waveguide 250, including the size and shape of the incoming light beam B1, the size and shape of the optical waveguide 250, and the size, shape, and configuration of the eye box or viewing aperture with respect to the eye 280 of a viewer.

The OE 305 and the OE 310 may be sized and arranged on the front surface 205 and/or the rear surface 206 to overlap and create the in-coupling region 210 and to overlap and create the out-coupling region 220. For example, referring to FIGS. 4A and 4B, an example top perspective view of the OE 305 is provided in FIG. 4A, and an example top perspective view of the OE 310 is provided in FIG. 4B. The OEs are shaped such that when the OE 305 and the OE 310 are placed on the optical waveguide 250 they overlap to form the regions 210 and 220.

Figure 4A:
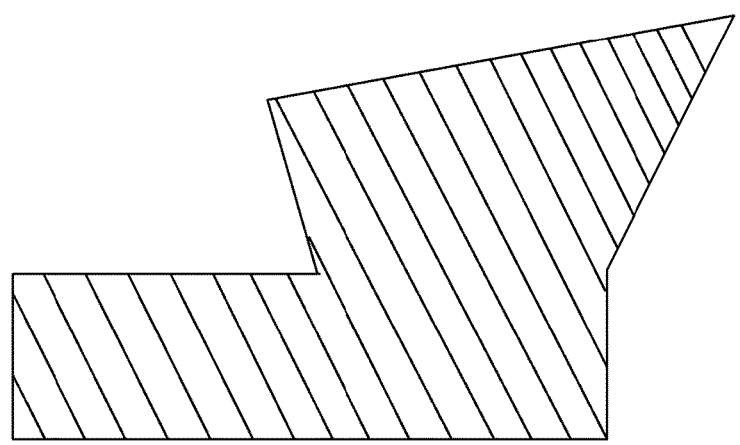
FIGS. 4A and 4B are illustrations of example optical elements.
Figure 4B:
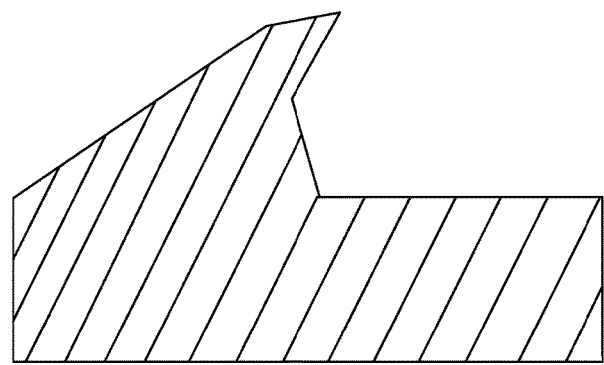
Figure 5:
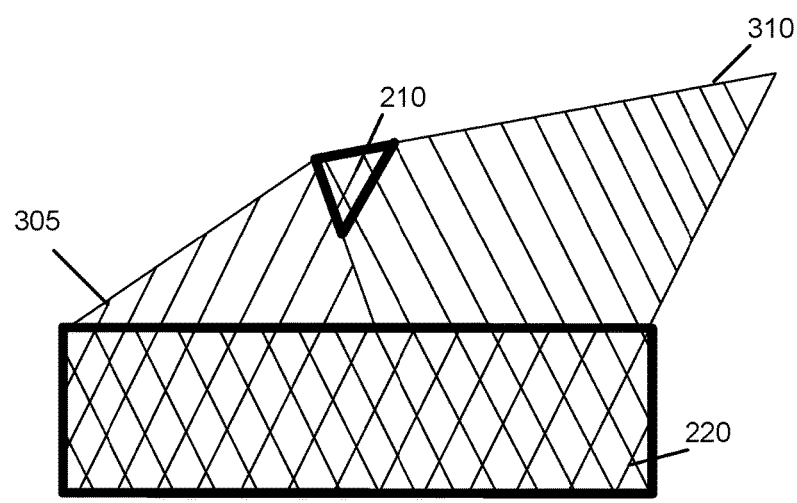
FIG. 5 is an illustration of overlapping optical elements showing in-coupling and out-coupling regions.

Referring to FIG. 5, the OE 305 of FIG. 4A and the OE 310 of FIG. 4B have been arranged such that the OE 305 and the OE 310 form the overlapping regions 210 and 220, which are illustrated using the darkened lines. Other shapes and arrangements of the OE 305 and the OE 310 may be used. Note that the OE 305 and the OE 310 may overlap when they appear to be on top of one another when viewed from either the front surface 205 or the rear surface 206. Accordingly, the OE 305 and the OE 310 may overlap when they are applied to the same or different surfaces of the optical waveguide 250.

Figure 6:
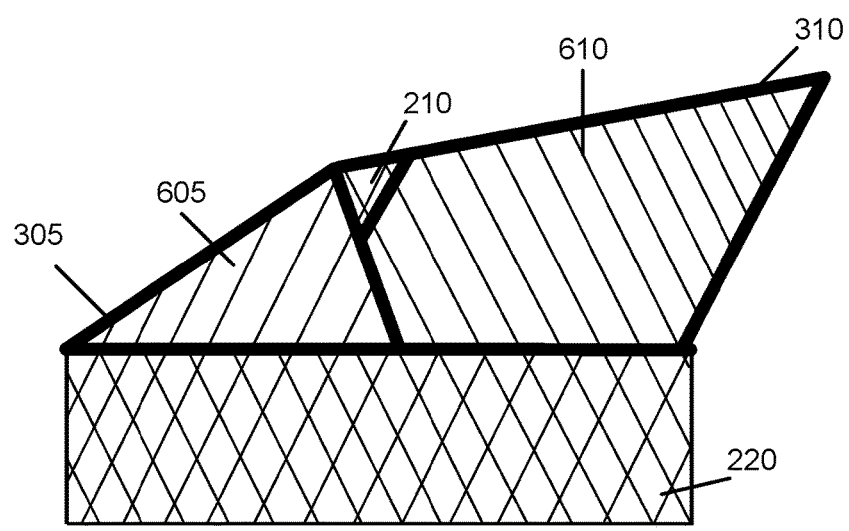
FIG. 6 is an illustration of overlapping optical elements showing non-overlapping regions.

As may be appreciated, the shape and arrangement of the OE 305 and the OE 310 on the optical waveguide 250 may also result in areas or regions where the OE 305 and the OE 310 do not overlap. For example, referring to FIG. 6, the arrangement of the OE 305 and the OE 310 results in the non-overlapping region 605 and the non-overlapping region 610, which are illustrated using the darkened lines. The region 605 may be part of the OE 305 and the region 610 may be part of the OE 310.

In some implementations, the OE 305 and the OE 310 may be arranged and shaped such that a size and shape of the in-coupling region 210 formed by the overlap of the OEs 305 and 310 substantially correspond to a size and shape of incoming beam B1 produced by the projector 290. The in-coupling region 210 may be circular, elliptical, or rectangular, for example. In the case of a circular-shaped in-coupling region 210, the in-coupling region 210 may be in the range of about 1 to about 5 millimeters in diameter. Other sizes may be used.

Similarly, the OEs 305 and 310 may be arranged and shaped such that a size and shape of the out-coupling region 220 formed by the overlap of the OEs 305 and 310 substantially corresponds to a desired size and shape of the eye box that is formed by the outgoing beam B3. The size and shape of the out-coupling region 220 may be defined by one or more of a desired field of view, a distance between the optical waveguide 250 and the eye (i.e., "eye-relief"), and an inter-pupillary distance range of the human anatomy.

When the beams B1 reach the in-coupling region 210, the OE 310 in-couples only first-order diffractions of the incoming beam B1. The in-coupled portions of the beams B1 diffracted by the OE 310 are directed into OE 305, where they undergo odd-order expansion and traverse the optical waveguide 250 in the x direction as part of the beams B2. When these beams B2 reach the out-coupling region 220, the overlapping portion of the OE 310 out-couples the beams B2 as the part of the beams B3 in they direction.

Conversely, incoming light of the beams B1 received at the in-coupling region 210 is in-coupled by the OE 305. The in-coupled portions of the beams B1 are diffracted by the OE 305 and are directed into OE 310, where they also undergo odd-order expansion and traverse the optical waveguide 250 in the x direction as part of the beams B2. When these beams B2 reach the out-coupling region 220, the overlapping portion of the OE 305 out-couples the beams B2 as the part of the beams B3 in they direction.

As described above, the particular grating periods and grating directions of the OE 305 and OE 310 may be selected or determined based on the size and shape of the various components making up the optical waveguide 250. In some implementations, a grating direction and grating period to effectively couple the expanded output beam having the desired properties in terms of field of view, etc. may be selected. The selected grating direction and period may also depend on the paths by which the transmitted light traverses through the optical waveguide 250. Once these properties are selected, the direction and period of gratings needed to in-couple light into the in-coupling region 210 and to achieve odd-order expansion may be determined.

The calculations used to determine the specific grating directions and grating periods for each of OE 305 and OE 310 for a particular application may be derived based on well-known diffraction equations. If the coordinate system is chosen such that the grating grooves are parallel to the xy coordinate plane, the grating equation for linear gratings can be expressed in the form of the following coupled equation pair:

$$k_{x,m} = k_{x,in} + m2\pi \cos(\varphi)/d$$

$$k_{y,m} = k_{y,in} + m2\pi \sin(\varphi)/d$$

where $k_{x,m}$ and $k_{y,m}$ denote the x and y components, respectively, of the wave vector of integer diffraction order m, $k_{x,in}$ and $k_{y,in}$ are the x and y components, respectively, of the wave vector of the incoming wave, d is the grating period, and $\varphi$ is the orientation of the grating vector with respect to the x direction in the xy plane.

The optical waveguide 250 discussed herein provides at least the following advantages. Because the optical waveguide 250 uses the same gratings to provide both even and odd order expansion, the energy between the two types of expansion is automatically balanced, which leads to better brightness and color uniformity in the output beam. The use of only two diffractive optical elements to form both the in-coupling region 210 and the out-coupling region 220 make the optical waveguide 250 easier to fabricate and less susceptible to fabrication errors. Where laser-interference lithography is used to form the diffractive optical elements, areas of the optical waveguide 250 can be formed using a single exposure which may avoid rotation-tolerance issues.

Another advantage of the optical waveguide 250 is that it avoids issues associated with the orientations of the OEs. In conventional waveguides the alignment of the front and rear OEs may require arc-second accuracy. However, such accuracy of alignment is not required in the optical waveguide 250 because of the relationship between the grating directions of the OE 305 and the OE 310.

Figure 7:
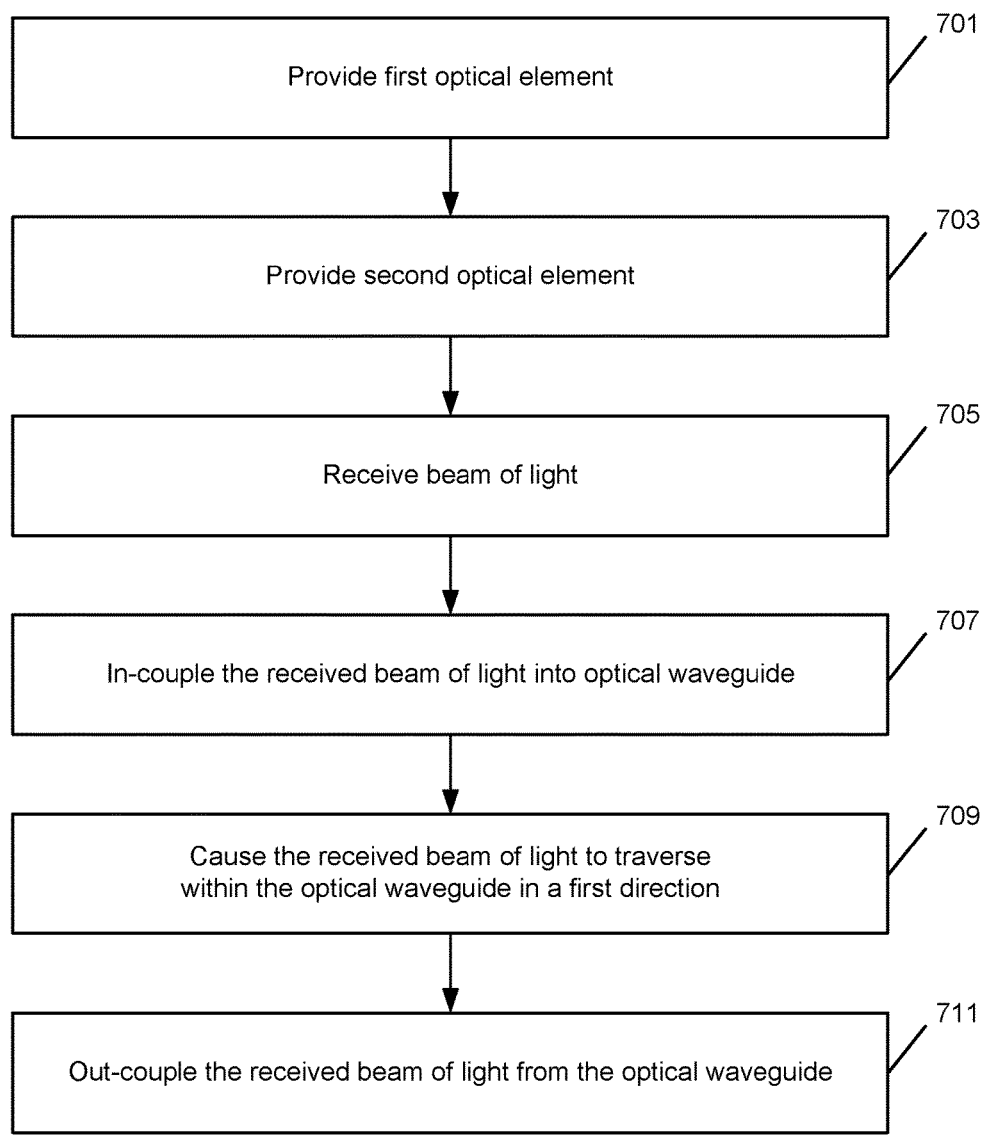
FIG. 7 is an operational flow of an implementation of a method for providing an optical waveguide with overlapping optical elements.

FIG. 7 is an operational flow of an implementation of a method 700 for operating a pupil expander in an HMD device 100. The method 700 may be implemented using the optical waveguide 250, for example.

At 701, a first OE is provided. The first OE 305 may be a diffractive OE such as a surface relief grating and may be provided onto one of a front surface 205 or a rear surface 206 of an optical waveguide 250.

At 703, a second OE is provided. The second OE 310 may also be a diffractive OE and may also be provided onto one of the front surface 205 or the rear surface 206 of the optical waveguide 250.

The second OE 310 may be sized and placed on the front surface 205 and/or the rear surface 206 such that a first overlapping region 210 and a second overlapping region 220 are defined. The first overlapping region 210 may be an in-coupling region and the second overlapping region 220 may be an out-coupling region. In addition, the first OE 305 and the second OE 310 may be sized and placed on the front surface 205 and/or rear surface 206 such that a non-overlapping region 605 and a non-overlapping region 610 are defined. The non-overlapping region 605 may include the first OE 305 and the non-overlapping region 610 may include the second OE 310. The first OE 305 and the second OE 310 may have opposite grating directions.

At 705, a beam of light is received. The beam B1 of light may be received by the in-coupling region 210 (i.e., the first overlapping region). The beam B1 may be generated by a projector 290 and may be received from an exit pupil of the projector 290.

At 707, the beam of light is in-coupled into the optical waveguide. The beam B1 may be in-coupled into optical waveguide 250 by one or both of the overlapping regions of the OE 305 and the OE 310 that form the in-coupling region 210. The particular OE that in-couples the beam B1 may depend on the angle that the B1 is received by the in-coupling region 210.

At 709, the received beam of light is caused to traverse within the optical waveguide in a first direction. The received beam B1 of light may traverse within the optical waveguide 250 as the beam B2. If the beam of light B1 was in-coupled by the OE 305 of the in-coupling region 210, then the beam of light B2 may be caused to traverse by the OE 310. If the beam of light B1 was in-coupled by the OE 310 of the in-coupling region 210, then the beam of light B2 may be caused to traverse by the OE 305.

At 711, the received beam is out-coupled from the optical waveguide. The received beam B1 may out-couple through the out-coupling region 220 as the beam B3. The beam B3 may form the eye box that is received by an eye 280 of an observer or wearer of an HMD device 100 that includes the optical waveguide 250.

It should be understood that the representations of the various elements set forth in the Figures are merely schematic representations, do not necessarily reflect the actual shape or dimensions for a particular application of the principles set forth herein, and are schematically represented to illustrate the principles set forth herein. As mentioned above, the specific grating directions and grating periods for each of OEs 305 and 310 are interdependent and may be selected based on the following factors: the specific geometries of the virtual display device; to in-couple only first-order diffractions into the diffractive beam expander; and to satisfy the conditions required for total internal reflection within the optical waveguide 250. It is desirable to provide flexibility in allowing for tilting of a waveguide plate to accommodate and/or compensate for certain human factors (e.g., skull shape, IPD range, etc.). Tilting the waveguide plate has also been found to be useful in reducing "ghost images" or "rainbows."

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, an optical waveguide is provided. The optical waveguide includes a front surface and a rear surface. The optical waveguide further includes a first optical element and a second optical element. The first optical element is disposed on the first surface or the second surface and defines a first region. The second optical element is disposed on the first surface or the second surface and defines a second region. The first optical element overlaps the second optical element to define a third region and a fourth region. The third region is configured to receive a beam of light, and in-couple the received beam of light into the optical waveguide. The first and second regions are configured to cause the received beam of light to traverse within the optical waveguide in a first direction. The fourth region is configured to out-couple the received beam of light from the optical waveguide in a second direction.

Implementations may include some or all of the following features. The first optical element may include a diffractive optical element. The first optical element may include a surface relieve grating, a polarization grating, a volume grating, or an index modulated grating. The beam of light may out-couple from the optical waveguide through the first surface. The beam of light may in-couple into the optical waveguide through the first surface. The beam of light may out-couple from the optical waveguide through the second surface. A grating direction of the first optical element may be a different direction than a grating direction of the second optical element. The first optical element may be disposed on the first surface and the second optical element may be disposed on the second surface.

In an implementation, a head mounted display device is provided. The head mounted display device includes a projector; a controller coupled to the projector and configured to cause the projector to project a beam of light; and a plurality of optical waveguides. Each optical waveguide may include: a first surface; a second surface; a first optical element disposed on the first surface of the second surface and defining a first region; and a second optical element disposed on the first surface or the second surface and defining a second region. The first optical element overlaps the second optical element to define a third region and a fourth region. The third region is configured to receive a beam of light, and in-couple the received beam of light into the optical waveguide. The first and second regions are configured to cause the received beam of light to traverse within the optical waveguide in a first direction. The fourth region is configured to out-couple the received beam of light from the optical waveguide in a second direction.

Implementations may include some or all of the following features. The first optical element may include a diffractive optical element. The first optical element may include a surface relieve grating. The beam of light may in-couple into the optical waveguide through the first surface. The beam of light may out-couple from the optical waveguide through the second surface. A grating direction of the first optical element may be different than a grating direction of the second optical element. The beam of light may out-couple from the optical waveguide through the first surface.

In an implementation, a method for operating an optical waveguide is provided. The method includes: providing a first optical element on a first surface of the optical waveguide, wherein the first optical element defines a first region; providing a second optical element on a second surface of the optical waveguide, wherein the second optical element defines a second region, and wherein the first optical element overlaps the second optical element to define a third region and a fourth region; receiving a beam of light by the third region; in-coupling the received beam of light into the optical waveguide by the third region; causing the received beam of light to traverse within the optical waveguide in a first direction by one or both of the first region and the second region; and out-coupling the received beam of light from the optical waveguide in a second direction by the fourth region.

Implementations may include some or all of the following features. The first optical element may include a diffractive optical element. A grating direction of the first optical element may be different than a grating direction of the second optical element. The first surface may include a front surface of the optical waveguide and the second surface may include a rear surface of the optical waveguide. The first optical element may include a surface relief grating, a polarization grating, a volume grating, or an index modulated grating.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. An optical waveguide comprising:
   a first surface;
   a second surface; and
   a first optical element disposed on the first surface or the second surface and defining a first region; and
   a second optical element disposed on the first surface or the second surface and defining a second region, wherein the first optical element overlaps the second optical element to define a third region and a fourth region, wherein the third region is configured to:
      receive a beam of light; and
      in-couple the received beam of light into the optical waveguide;
   wherein the first and second regions are configured to cause the received beam of light to traverse within the optical waveguide in a first direction; and
   wherein the fourth region is configured to out-couple the received beam of light from the optical waveguide in a second direction.

2. The optical waveguide of claim 1, wherein the first optical element comprises a diffractive optical element.

3. The optical waveguide of claim 2, wherein the first optical element comprises a surface relief grating, a polarization grating, a volume grating, or an index modulated grating.

4. The optical waveguide of claim 1, wherein the beam of light out-couples from the optical waveguide through the first surface.

5. The optical waveguide of claim 1, wherein the beam of light in-couples into the optical waveguide through the first surface.

6. The optical waveguide of claim 1, wherein the beam of light out-couples from the optical waveguide through the second surface.

7. The optical waveguide of claim 1, wherein a grating direction of the first optical element is different than a grating direction of the second optical element.

8. The optical waveguide of claim 1, wherein the first optical element is disposed on the first surface and the second optical element is disposed on the second surface.

9. A head mounted display device comprising:
   a projector;
   a controller coupled to the projector and configured to cause the projector to project a beam of light; and
   a plurality of optical waveguides, wherein each optical waveguide comprises:
      a first surface;
      a second surface;

a first optical element disposed on the first surface of the second surface and defining a first region; and a second optical element disposed on the first surface or the second surface and defining a second region, wherein the first optical element overlaps the second optical element to define a third region and a fourth region, wherein the third region is configured to:

receive a beam of light; and in-couple the received beam of light into the optical waveguide;

wherein the first and second regions are configured to cause the received beam of light to traverse within the optical waveguide in a first direction; and wherein the fourth region is configured to out-couple the received beam of light from the optical waveguide in a second direction.

10. The head mounted display of claim 9, wherein the first optical element comprises a diffractive optical element.

11. The head mounted display of claim 10, wherein the first optical element comprises a surface relieve grating.

12. The head mounted display of claim 9, wherein the beam of light in-couples into the optical waveguide through the first surface.

13. The head mounted display of claim 9, wherein the beam of light out-couples from the optical waveguide through the second surface.

14. The head mounted display of claim 9, wherein a grating direction of the first optical element is different than a grating direction of the second optical element.

15. The head mounted display of claim 9, wherein the beam of light out-couples from the optical waveguide through the first surface.

16. A method comprising:

providing a first optical element on a first surface of an optical waveguide, wherein the first optical element defines a first region;

providing a second optical element on a second surface of the optical waveguide, wherein the second optical element defines a second region, and wherein the first optical element overlaps the second optical element to define a third region and a fourth region;

receiving a beam of light by the third region;

in-coupling the received beam of light into the optical waveguide by the third region;

causing the received beam of light to traverse within the optical waveguide in a first direction by one or both of the first region and the second region; and out-coupling the received beam of light from the optical waveguide in a second direction by the fourth region.

17. The method of claim 16, wherein the first optical element comprises a diffractive optical element.

18. The method of claim 16, wherein a grating direction of the first optical element is different than a grating direction of the second optical element.

19. The method of claim 16, wherein the first surface comprises a front surface of the optical waveguide and the second surface comprises a rear surface of the optical waveguide.

20. The method of claim 16, wherein the first optical element comprises a surface relief grating, a polarization grating, a volume grating, or an index modulated grating.

* * * * *